Patented Jan. 25, 1927.

1,615,212

UNITED STATES PATENT OFFICE.

ADOLPH LIONEL BURLIN, OF LONDON, ENGLAND, ASSIGNOR OF ONE-THIRD TO SHELDON LEICESTER AND ONE-THIRD TO LEONARD BALDWIN HOLMAN, BOTH OF LONDON, ENGLAND.

MANUFACTURE OF DENTURES AND THE LIKE.

No Drawing. Application filed February 5, 1926, Serial No. 86,346, and in Great Britain February 11, 1925.

This invention relates to the manufacture of dentures and the like and has for its object to provide improvements therein.

As is well known, in the manufacture of dentures, obturators for cleft palates and the like, precious metals and vulcanite are commonly used.

Attempts have been made to employ nitrocellulose compositions in substitution for the materials referred to, but it has been found that nitrocellulose (or its plastics) is unsuitable for use except in the manufacture of dentures for exhibition in show cases or the like.

Vulcanite, which is the material most extensively used in the manufacture of dentures, has certain disadvantages. It is, for instance, brittle and liable to fracture and is found to irritate the gums of certain subjects.

According to the present invention, in the production of dentures and the like, water insoluble organic derivatives of cellulose, capable of being moulded in a granular or pulverulent form, are introduced into a heated mould the two halves of which are brought together under the action of pressure.

Normally the materials in question will be used in combination with bodies adapted to act as plasticizers or colloiding agents and as colloiding agents or plasticizers, bodies which are substantially tasteless and odourless must be used.

In carrying the invention into effect, cellulose acetate in association with known colloiding agents, such as benzyl alcohol, benzoin, benzil or triacetin, in a proportion of 25 parts of colloiding agent to 75 parts of cellulose acetate together with a sufficient proportion of a pigment to secure the desired colour and opacity may be used.

As an example of a suitable cellulose derivative a cellulose acetate may be specified.

In forming from cellulose acetate, or the like, compositions in accordance with the invention for use in the manufacture of dentures and the like, a proportion of a suitable plasticizing agent adapted to enable the material to be moulded under heat in the absence of added volatile solvents will be employed.

For colouring the composition white titanium pigments in association with vermilion or other suitably coloured pigments may be used.

Thus in accordance with the invention, the case of teeth embedded in wax is inserted into the flask in the reverse direction from that in which the case of teeth is inserted therein when using vulcanite. In other words, the teeth have the biting surface inserted in the plaster.

The flask is finished in the usual manner, opened when the plaster has set and the wax removed in the usual way.

The two halves of the flask after heating to the desired temperature that is to say a temperature in the neighbourhood of 180° C. are taken, a cellulose ester composition in granular form is introduced into the half containing the teeth, and the said half with the cellulose ester mass therein heated to the desired temperature in a press under direct dry heat.

When the temperature of the flask registers 160° C. or thereabouts (it should not exceed 200° C.) the two halves of the flask are brought together and pressure is gradually applied until the flask is completely closed. This operation may take about fifteen minutes. So soon as the flask is completely closed it is placed in cold water where it is allowed to remain until quite cold.

The flask is then opened and the case removed, the surplus material being trimmed off and the case finished in the usual manner.

With the material employed in accordance with the invention, repairs to the denture are facilitated. For instance, if a tooth is broken away, the portion adjacent to the broken tooth is cut from the plate with a fret-saw, a new tooth is inserted in that place on a piece of modelling wax and the plate so prepared removed intact, inserted in plaster in a repairing flask, a piece of the cellulose derivative composition inserted and the flask introduced into and treated in the press as above described.

Preferably, a dove-tailed slot or the like is cut in the plate of the existing denture in order to assist further in securing satisfactory connection between it and the added portion.

Optionally, the connection between the replaced and the original portion is effected by the employment of suitable volatile solvents.

I claim:

A denture comprising artificial teeth and a moulded composition containing water-insoluble organic derivatives of cellulose conforming with the shape of the jaw with which the denture is to be associated.

In testimony whereof I have signed my name to this specification.

ADOLPH LIONEL BURLIN